Patented Oct. 5, 1954

2,690,974

UNITED STATES PATENT OFFICE 2,690,974

CHROME-MAGNESIA REFRACTORIES

Ralph Joseph Magri, Jr., Lynchburg, Va., assignor to Corhart Refractories Company, Louisville, Ky., a corporation of Delaware No Drawing. Application April 16, 1952,
Serial No. 282,708

9 Claims. (Cl. 106—59)

This invention relates to fused or heat-cast refractories and is particularly concerned with the provision of an improved refractory especially adapted for use in the manufacture of steel.

In my Patent No. 2,599,566, issued June 10, 1952 on my copending application Serial No. 233,945, filed June 27, 1951, as a continuation-in-part of my prior applications Serial No. 7,710, filed February 11, 1948, and now abandoned, and Serial No. 83,999, filed March 28, 1949, and also now abandoned, I have described a dense, fused high-iron chrome-spinel refractory that possesses marked resistance to heat shock or spalling together with good resistance to attack by ferruginous slags and is thus of unusual value in the construction of open hearth furnaces. Such refractory contains FeO, MgO, $Al_2O_3$ and $Cr_2O_3$ and is particularly characterized by a magnesia content sufficient to form a separate periclase phase in substantial amount and by a ratio of the mols of RO oxides to the mols of $R_2O_3$ oxides of at least 2.2 and advantageously at least 3.5, with such molal ratio being at least 4.0 for best resistance to spalling and to slag attack. The FeO content of such refractory is partitioned between the spinel phase and the periclase phase and ranges from 5 to 25% and preferably falls between 7 and 20%, with such range being desirably 9 to 17% when the molal ratio of RO oxides to $R_2O_3$ oxides is at least 4.0.

During use in an open hearth furnace, for example, whether located at the slag line or above, this fused chrome-spinel refractory does undergo gradual corrosion but at an appreciably slower rate than comparable burnt chrome and magnesite refractories. What happens, as has been determined by analytical examination and observation, is that the refractory absorbs iron in the form of $Fe_2O_3$ at its surface, which absorbed iron combines with magnesia from the periclase phase to form magnesio-ferrite, $MgO.Fe_2O_3$. As the amount of this magnesio-ferrite, which has a melting point only slightly above the usual operating temperature of an open hearth furnace and which forms a solid solution with the chrome-containing spinel, increases, the melting point of the refractory at such surface and hence its refractoriness are correspondingly lowered, with the result that the refractory gradually disappears through fluxing and liquefaction. Where the refractory is in contact with molten slag, this fluxing action is of course accentuated by the eroding effect of the slag itself.

It would appear, at least theoretically, that the corrosion-erosion resistance of this fused refractory could be improved in this respect by materially decreasing its FeO content. There would then be less iron available in the refractory itself for conversion to $Fe_2O_3$ during use with concomitant formation of $MgO.Fe_2O_3$, and the life of the refractory should be correspondingly extended.

I have now discovered that the corrosion-erosion resistance of such fused chrome-spinel refractory can be increased by so decreasing its initial FeO content, without adversely affecting its spalling resistance, provided that a satisfactory molal ratio of the RO oxides to the $R_2O_3$ oxides is maintained. Such ratio, I have found, should be at least 2.4 and is advantageously at least 3.5. I have also discovered that, surprisingly, with an FeO content of less than 5%, resistance to spalling becomes again poor if this ratio exceeds about 10; and such ratio should desirably be no greater than 9.0.

As with the fused refractories described in my copending application Serial No. 233,945, the coefficient of expansion of the present fused refractories is not high relative to that of other refractories and in some instances is even less than the expansion coefficients of various commercial burnt chrome and magnesite refractories. The tensile strength of the present refractories is also higher than that of commercial burnt chrome and magnesite refractories so that greater strains can be developed therein before failure. On the other hand the thermal conductivity of such refractories is also higher so that the temperature gradients obtained within such refractories when they are subjected to alternate heating and cooling are lessened. Apparently these properties are more significant with respect to spalling resistance than the dense structure of these refractories.

As will be appreciated, relatively high temperatures are required to fuse the present compositions so that electric melting must be resorted to. The raw materials can be melted in a conventional electric furnace, the shell of which is lined with material of a composition similar to that of the refractory to be produced. The molten material can then be cast into molds. The resulting refractory pieces, following initial solidification, should be annealed either from their own heat of crystallization with the aid of appropriate insulation or with the addition of external heat in a lehr.

In the resulting fused refractory, as with the refractory described in my copending application, the FeO is partitioned between the periclase phase, in which it is present in solid solution, and the spinel phase, in which it is present, of course, as an RO spinel-forming oxide. Apparently what happens is that, as the spinel phase is formed upon cooling and solidification of the molten refractory mass, the MgO forms spinels with the $R_2O_3$ oxides in preference to the FeO so that, in effect, the FeO is in part displaced into the periclase phase formed by the remaining MgO. So far as can be determined, this partitioning effect occurs even in those refractory compositions containing the smallest amounts of FeO within the range set out below.

The proportions within which the several oxides forming the basis of the present refractory can be varied are determined in part by the effect of the variation on the spalling resistance of the refractory. The $Al_2O_3$ and $Cr_2O_3$ content, for example, cannot be increased to such an extent that the ratio of the mols of RO oxides to the mols of $R_2O_3$ oxides falls below about 2.4 and the resistance of the refractory to spalling becomes unsatisfactory; neither can their content be so lowered that such ratio exceeds about 10 and the spalling resistance again becomes unsatisfactory. For the same reason, the content of FeO and MgO cannot be so lowered that such ratio becomes less than 2.4, or so increased that such ratio exceeds about 10. Moreover, as indicated above, sufficient MgO must be present to form the periclase phase, which, as can be readily determined, will amount to a minimum of approximately 23%. As will be apparent, a periclase phase can be formed only if an excess of RO oxide exists beyond that required to combine with the $R_2O_3$ oxides to form $RO.R_2O_3$.

These proportions are also in part governed by the nature of the slag with which the refractory is to come in contact. While, for example, the resistance of the present refractory to attack by basic slag improves with an increase in MgO (and, hence, the periclase phase), its resistance to acid slag attack tends to correspondingly decrease. Conversely, too low an MgO content decreases the ability of the refractory to withstand basic slag attack. Similarly, an increase in $Cr_2O_3$ (and, hence, the chrome-containing spinel phase) improves the resistance of the refractory to acid slag attack but tends to lower its resistance to basic slag. Too low a $Cr_2O_3$ content, on the other hand, decreases the resistance of the refractory to acid slag attack. A high ratio of $Cr_2O_3$ to $Al_2O_3$ also facors acid slag resistance. Where both types of slag are encountered as in open hearth practice, a practical compromise is of course necessary.

Additionally, as the MgO content is increased, the temperature required to effect fusion also increases with the results that volatilization of MgO becomes more and more appreciable and the production of a commercially satisfactory and usable refractory casting becomes more and more difficult.

Since the heat-casting process required for the manufacture of the present refractories is inherently more expensive than the conventional sintering techniques of making refractories, it is desirable that only commonly available raw materials such as calcined magnesite and chrome ore be used in the production of the instant refractories. Calcined magnesite can be readily employed for such purpose and is relatively inexpensive. While chrome ore, which is basically chromite ($FeO.Cr_2O_3$) but in which in nature appreciable MgO replaces FeO and appreciable $Al_2O_3$ replaces $Cr_2O_3$ in the spinel lattice, would be generally suitable for the present purpose if its FeO content were on the low side, such a low-iron chrome ore is unfortunately relatively expensive. A similar situation obtains with other low iron-content raw materials suitable for producing the instant refractory. It is, of course, entirely possible to provide the several oxides constituting the present refractory in more or less pure condition and to fuse an appropriate mixture thereof, but such procedure is obviously commercially impracticable.

I have found, nevertheless, that the less expensive, higher iron-content chrome ores can be utilized in the production of the present refractory by providing for elimination of the necessary amount of FeO from the refractory mass during its fusion. This purpose can be accomplished, for example, by effecting reduction of the FeO to metallic iron as through the use of metallic aluminum, which is desirably added to the molten refractory mass just prior to casting thereof. The resulting metallic iron settles to the bottom of the melting chamber. Since $Al_2O_3$ is also formed in such reaction, the amounts of the several raw materials should be suitably adjusted to provide the desired oxide proportions in the fused refractory. Reduction of the FeO content to less than about 1% however is not practicable in view of the excessive amount of aluminum that would be required, in which case excessive reduction of $Cr_2O_3$ to metallic chromium would also be encountered.

With these several considerations in mind, then, the present refractory composition comprises and analytically contains 1% but less than 5% FeO, 40 to 78% MgO, 5 to 45% $Al_2O_3$, and 5 to 50% $Cr_2O_3$, with the ratio of the mols of FeO and MgO to the mols of $Al_2O_3$ and $Cr_2O_3$ being between 2.4 and 10. The total of such oxides should amount to at least 87% and advantageously at least 92% in order to provide satisfactory spalling resistance and resistance to slag attack.

As well known, commercial chrome ores contain a small amount of a siliceous gangue. When such a chrome ore is used as a raw material in the preparation of the present refractory, then, a siliceous matrix containing any impurities is also formed upon solidification of the molten refractory composition. This siliceous matrix is largely crystalline in nature, even in relatively rapidly cooled castings. In the absence of appreciable calcium oxide, this siliceous matrix or phase has the crystallographic properties of forsterite, $2MgO.SiO_2$, with presumably some FeO replacing a part of the MgO.

Moderate amounts of this siliceous matrix, such as are fortunately obtained with commercial grade chrome ores, are not harmful either to the heat-shock resistance of the instant refractory or to its resistance to acid slag attack. As the percentage of silica is increased, however, resistance to spalling decreases; and with larger amounts the castings crack so badly even before heating that they are unsaleable. Moreover, as the silica content is increased, the resistance of the present refractory against acid slag decreases. From this standpoint as well as the standpoint of heat-shock resistance, therefore, the $SiO_2$ content should be not more than 9% and advantageously not more than 7%.

With $SiO_2$ in the composition, the periclase phase can, of course, be formed only if there is an excess of RO oxide beyond that required to combine with the SiO₂ to form 2RO.SiO₂ and to combine with the Al₂O₃ and the Cr₂O₃ to form RO.R₂O₃. An excess of RO oxide is therefore indicated when the ratio of the mols of FeO and MgO to the mols of Al₂O₃ and Cr₂O₃ plus half the mols of SiO₂ exceeds unity. As previously pointed out, this ratio is between 2.4 and 10 and advantageously between 3.5 and 9.0 in the present refractory.

Commercially available calcined magnesites of good quality generally contain a small amount of CaO as an impurity. Dolomitic magnesites may also be utilized under certain conditions, but then CaO in appreciable quantities will be included in the refractory composition. Since CaO does not form a spinel, it will appear in the siliceous matrix when it is present in the raw materials. As the CaO increases in proportion, it progressively replaces MgO to give monticellite, dicalcium silicate, and finally tricalcium silicate. If the combining power of the SiO₂ is exceeded, calcium chromite is formed with the result that serious cracking of the castings occurs during their manufacture. The basic slag resistance of the present refractory is also decreased as the CaO content is increased, especially in the presence of significant quantities of SiO₂. For these reasons, then, the CaO content should not be more than 6%; and advantageously no more than 3% CaO is present.

Since the effect of CaO is to displace MgO from the siliceous matrix, an excess of RO oxide is indicated in such case when the ratio of the mols of FeO, MgO, and CaO to the mols of Al₂O₃ and Cr₂O₃ plus half the mols of SiO₂ (if present) exceeds unity. As already stated, this ratio is between 2.4 and 10 and advantageously between 3.5 and 9.0 in the present refractory.

In the use of a chrome ore in the production of a refractory composition low in Cr₂O₃, not much iron oxide will be introduced with the chrome ore, the amount depending of course on the grade of chrome ore employed. It may not be necessary, then, to reduce any of the iron oxide to metallic iron, in which event, if the chrome ore is partially oxidized, any Fe₂O₃ present therein may remain as such in part in the final refractory. As illustrative of the small amounts of Fe₂O₃ that may be expected under such circumstances, a refractory of the present type containing 2.6% FeO by analysis also contained 1.3% Fe₂O₃ by analysis. Since, as already indicated, MgO.Fe₂O₃ forms during use of the present type of refractory in an open hearth furnace with gradual fluxing of the refractory, it is desirable of course to maintain the initial Fe₂O₃ content as low as possible in order to prolong the life of the refractory.

The melt (casting) analyses given in Table I are illustrative of the composition of the present refractory (as is usual practice with chrome refractories, total analyzed Fe is calculated as FeO in this and the following tables):

*Table I*

| Melt | FeO | MgO | Al₂O₃ | Cr₂O₃ | SiO₂ | CaO |
|---|---|---|---|---|---|---|
| I | 2.2 | 30.3 | 43.0 | 22.7 | 1.3 | 0.5 |
| II | 1.6 | 42.0 | 29.6 | 24.6 | 1.8 | 0.4 |
| III | 2.7 | 43.2 | 32.6 | 20.0 | 1.2 | 0.3 |
| IV | 3.9 | 53.2 | 33.0 | 7.1 | 2.4 | 0.4 |
| V | 1.8 | 56.0 | 20.2 | 20.5 | 1.1 | 0.4 |
| VI | 3.5 | 55.2 | 16.0 | 20.6 | 4.3 | 0.4 |
| VII | 4.2 | 64.7 | 19.9 | 9.0 | 1.6 | 0.6 |
| VIII | 4.0 | 69.2 | 14.7 | 9.0 | 2.5 | 0.6 |
| IX | 3.1 | 71.0 | 11.7 | 11.6 | 2.0 | 0.6 |
| X | 3.6 | 73.6 | 8.4 | 10.6 | 3.2 | 0.6 |

Each of these refractory castings comprises a chrome-containing spinel, periclase, and a siliceous matrix. There is only one spinel phase, which contains both FeO and MgO as RO oxides and both Cr₂O₃ and Al₂O₃ (and any Fe₂O₃) as R₂O₃ oxides in random distribution. Only melts III to IX possess satisfactory resistance to spalling, however, melts I, II and X exhibiting poor or unsatisfactory spalling resistance. As can readily be determined (in the manner explained above), the molal ratio of RO oxides to R₂O₃ oxides in melts III to IX is between 2.4 and 10, whereas such ratio for melts I and II is below 2.4 and for melt X is above 10.

Especially good resistance to heat shock or spalling as well as good resistance to both acid slag and basic slag are obtained when the present refractory composition comprises and analytically contains 1% but less than 5% FeO, 45 to 75% MgO, 5 to 38% Al₂O₃, and 5 to 45% Cr₂O₃, the total of such oxides amounting to at least 92%, the molal ratio of RO oxides to R₂O₃ oxides (as determined in accordance with the above-explained procedures) being between 3.5 and 9.0. Any SiO₂ or CaO that may be present should desirably be no more than 7% or 3% respectively. The melt (casting) analyses given in Table II are illustrative of this preferred range of compositions:

*Table II*

| Melt | FeO | MgO | Al₂O₃ | Cr₂O₃ | SiO₂ | CaO |
|---|---|---|---|---|---|---|
| XI | 4.1 | 56.0 | 29.1 | 5.3 | 5.1 | 0.4 |
| XII | 3.1 | 62.8 | 12.7 | 18.4 | 2.5 | 0.5 |
| XIII | 4.4 | 58.8 | 12.2 | 21.1 | 3.0 | 0.5 |
| XIV | 2.6 | 61.0 | 14.2 | 18.6 | 3.0 | 0.6 |
| XV | 1.9 | 62.6 | 7.8 | 23.9 | 3.3 | 0.5 |
| XVI | 2.4 | 66.9 | 14.4 | 9.4 | 6.3 | 0.6 |
| XVII | 3.0 | 69.7 | 8.2 | 16.4 | 2.1 | 0.6 |

The melt (casting) analyses given in Table III are illustrative of the effect of too much SiO₂:

*Table III*

| Melt | FeO | MgO | Al₂O₃ | Cr₂O₃ | SiO₂ | CaO |
|---|---|---|---|---|---|---|
| XII | 3.1 | 62.8 | 12.7 | 18.4 | 2.5 | 0.5 |
| XI | 4.1 | 56.0 | 29.1 | 5.3 | 5.1 | 0.4 |
| XVI | 2.4 | 66.9 | 14.4 | 9.4 | 6.3 | 0.6 |
| XVIII | 2.8 | 47.4 | 23.7 | 18.2 | 7.5 | 0.4 |
| XIX | 2.9 | 59.4 | 15.3 | 10.9 | 10.9 | 0.6 |

The spalling resistance of the first four melts was satisfactory, but melt XIX cracked so badly during annealing that it was unusable.

Table IV presents several melt (casting) analyses illustrating the effect of too much CaO:

*Table IV*

| Melt | FeO | MgO | Al₂O₃ | Cr₂O₃ | SiO₂ | CaO |
|---|---|---|---|---|---|---|
| XVI | 2.4 | 66.9 | 14.4 | 9.4 | 6.3 | 0.6 |
| XX | 4.6 | 58.4 | 19.6 | 10.0 | 2.4 | 5.0 |
| XXI | 3.3 | 45.9 | 22.8 | 15.7 | 8.2 | 4.1 |
| XXII | 2.3 | 55.9 | 22.9 | 10.1 | 2.2 | 6.6 |
| XXIII | 3.2 | 45.7 | 19.9 | 15.3 | 8.9 | 7.0 |
| XXIV | 2.7 | 53.6 | 20.8 | 9.5 | 1.8 | 11.6 |

The first three melts possessed satisfactory resistance to spalling. Melt XXII, on the other hand, contained more CaO than could combine with the SiO₂ and the refractory cracked during annealing. Moreover, as the SiO₂ approaches the upper end of its range, and the CaO content should be maintained such that the total of SiO₂ and CaO is no greater than 13% in order to avoid a tendency to crack during annealing, as exhibited by melts XXIII and XXIV. Advantageously, the total of SiO₂ and CaO should generally not greatly exceed 8% since otherwise a decreased resistance to slag attack results.

I claim:

1. A fused refractory material comprising a chrome-containing spinel and periclase, said refractory material analytically containing 1% but less than 5% FeO, 40 to 78% MgO, 5 to 45% Al₂O₃, and 5 to 50% Cr₂O₃, the total of such oxides amounting to at least 87%, the ratio of the mols of FeO and MgO to the mols of Al₂O₃ and Cr₂O₃ being between 2.4 and 10.

2. The fused refractory material as claimed in claim 1, in which the total of FeO, MgO, Al₂O₃, and Cr₂O₃ amounts to at least 92%.

3. A fused refractory material comprising a chrome-containing spinel, periclase, and a siliceous matrix, said refractory material analytically containing 1% but less than 5% FeO, 40 to 78% MgO, 5 to 45% Al₂O₃, and 5 to 50% Cr₂O₃, the total of such oxides amounting to at least 87%, and SiO₂ in an amount up to 9%, the ratio of the mols of FeO and MgO to the mols of Al₂O₃ and Cr₂O₂ plus half the mols of SiO₂ being between 2.4 and 10.

4. The fused refractory material as claimed in claim 3, in which the total of FeO, MgO, Al₂O₃, and Cr₂O₃ amounts to at least 92%.

5. A fused refractory material comprising a chrome-containing spinel, periclase, and a siliceous matrix, said refractory material analytically containing 1% but less than 5% FeO, 40 to 78% MgO, 5 to 45% Al₂O₃, and 5 to 50% Cr₂O₃, the total of such oxides amounting to at least 87%, SiO₂ in an amount up to 9%, and CaO in an amount up to 6%, the ratio of the mols of FeO, MgO, and CaO to the mols of Al₂O₃ and Cr₂O₃ plus half the mols of SiO₂ between 2.4 and 10.

6. The fused refractory material as claimed in claim 5, in which the total of FeO, MgO, Al₂O₃, and Cr₂O₃ amounts to at least 92%.

7. A fused refractory material comprising a chrome-containing spinel and periclase, said refractory material analytically containing 1% but less than 5% FeO, 45 to 75% MgO, 5 to 38% Al₂O₃, and 5 to 45% Cr₂O₃, the total of such oxides amounting to at least 92%, the ratio of the mols of FeO and MgO to the mols of Al₂O₃ and Cr₂O₃ being between 3.5 and 9.0.

8. A fused refractory material comprising a chrome-containing spinel, periclase, and a siliceous matrix, said refractory material analytically containing 1% but less than 5% FeO, 45 to 75% MgO, 5 to 38% Al₂O₃, and 5 to 45% Cr₂O₃, the total of such oxides amounting to at least 92%, and SiO₂ in an amount up to 7%, the ratio of the mols of FeO and MgO to the mols of Al₂O₃ and Cr₂O₃ plus half the mols of SiO₂ being between 3.5 and 9.0.

9. A fused refractory material comprising a chrome-containing spinel, periclase, and a siliceous matrix, said refractory material analytically containing 1% but less than 5% FeO, 45 to 75% MgO, 5 to 38% Al₂O₃, and 5 to 45% Cr₂O₃, the total of such oxides amounting to at least 92%, SiO₂ in an amount up to 7%, and CaO in an amount up to 3%, the ratio of the mols of FeO, MgO, and CaO to the mols of Al₂O₃ and Cr₂O₃ plus half the mols of SiO₂ being between 3.5 and 9.0.

References Cited in the file of this patent

UNITED STATES PATENTS

| Number | Name | Date |
|---|---|---|
| 2,358,652 | Nicholas | Sept. 19, 1944 |
| 2,599,566 | Magri | June 10, 1952 |